United States Patent [19]

Stolove

[11] 4,183,819

[45] Jan. 15, 1980

[54] SOLUTION AND METHOD FOR CLEANING, POLISHING AND LUBRICATING MAGNETIC HEADS

[76] Inventor: Solomon Stolove, 100 E. 18th St., Brooklyn, N.Y. 11236

[21] Appl. No.: 923,974

[22] Filed: Jul. 12, 1978

[51] Int. Cl.$^2$ .................. C11D 7/50; C09G 1/02; G11B 5/40
[52] U.S. Cl. .................. 252/144; 106/8; 106/243; 106/287.14; 134/42; 252/496; 252/165
[58] Field of Search .................. 252/144, 165, 49.6; 134/42, 4, 6, 41; 274/47; 360/128; 15/210 R; 106/8, 243, 287.14

[56] References Cited

U.S. PATENT DOCUMENTS

| | | | |
|---|---|---|---|
| 3,008,852 | 11/1961 | Valiulis | 134/6 |
| 3,761,994 | 10/1973 | Becht | 274/47 X |
| 3,827,699 | 8/1974 | Waugh | 274/47 |
| 3,881,195 | 4/1975 | Ono et al. | 274/47 X |
| 3,978,520 | 8/1976 | Nowicki et al. | 274/47 X |
| 4,065,798 | 12/1977 | Sugisaki et al. | 15/210 R X |

*Primary Examiner*—Harris A. Pitlick
*Attorney, Agent, or Firm*—Leonard W. Suroff

[57] ABSTRACT

A liquid solution and method for cleaning, polishing and lubricating the magnetic record/playback heads of tape recorders is provided comprising;

(a) a mixture of micropulverized inorganic oxides;
(b) a mixture of lower alkyl silanes;
(c) an alkaline earth metal carbonate;
(d) a long chain fatty acid having from 16 to 20 carbon atoms; and
(e) a solvent mixture of lower alkyl alcohols having from about 1 to 4 carbon atoms.

14 Claims, No Drawings

SOLUTION AND METHOD FOR CLEANING, POLISHING AND LUBRICATING MAGNETIC HEADS

BACKGROUND OF THE INVENTION

This invention is concerned with a liquid solution for cleaning, polishing and lubricating the magnetic record/playback heads of tape recorders.

Recording tape generally comprises a reel of a plastic material having fine particles of iron oxide embedded therein for recording purposes. The gradual buildup of deposits of iron oxide as well as dirt, dust and other materials on the magnetic heads of both audio and video magnetic tape recorders during operation of the machines by transfer of these materials to the head surface is unavoidable. However, these deposits interfere with recording and playback operations and therefore must periodically be removed. This removal is generally accomplished by using a number of devices such as cleaning tapes or other apparatus containing a cleaning agent which engage the recorder head to effect removal of deposits.

In U.S. Pat. No. 3,008,852 to S. B. Valiulis for example, a tape recorder head cleaning tape is described comprising a tape impregnated with a petroleum solvent and a cleaning compound which tape clears out whatever coating of finely powdered iron oxide has been deposited on the head off the recording tape.

In U.S. Pat. No. 3,761,994 to A. B. Becht, a device is described for cleaning the magnetic tape heads of a cassette recorder which comprises a spring-biased cleaning arm disposed within a cartridge adapted to be mounted within the cassette unit for contacting the heads. The arm contains cleaning pads treated with isopropyl alcohol for removing deposits.

In U.S. Pat. No. 3,881,195 to K. Ono, a transducer unit for cleaning a magnetic tape recording and/or reproducing head is provided which employs a cleaning piece made of synthetic or natural spongy material, felt cloth, flexible plastic foam or the like which is impregnated with a cleaning liquid such as silicon oil, benzine or acetone.

In U.S. Pat. No. 3,978,520 to J. W. Nowicki, a magnetic head cleaning tape and method is described for a cassette recorder which contains a coating made from a solution of cyclohexanone, a lower polypropyleneoxy quaternary ammonium compound, butyl myristate lubricant, chromium dioxide and aluminum oxide pigment, a binder solution containing an adherent polyester urethane polymer of neopentyl glycol, epsiloncaprolactone diol, and p,p-diphenylmethane diiocyanate in 2-butanone, and a resin solution comprising a bisphenol A and epichlorohydrin copolymer in 2-butanone.

Finally, in U.S. Pat. No. 4,065,798 to T. Sugisaki, a cleaning cartridge for magnetic heads is provided which employs a cleaning disc comprising a support, a magnetic layer on both surfaces of the support and a fibrous material layer on only one of the magnetic layers. The magnetic layer comprises a magnetic dispersion on a support which includes a ferromagnetic fine powder such as iron oxide or chromium oxide, a binder such as an organic polymer, a dispersing agent, lubricant, abrasive and an organic solvent.

The present invention, on the other hand, comprises a hand-applied liquid solution for cleaning, polishing and lubricating magnetic record/playback heads for magnetic tape recorders, open reel and cassettes systems with record and play facilities, magnetic tape reproducers which are used for the express purpose of playing tapes only, dictating units, video tape recorders, computer-tape transport systems and magnetic sound recorders such as those used in the motion picture industry for recording sound upon the striped portion of the film. The solution is applied to the surface of the magnetic head by means of a cotton tipped swab or other soft non-abrasive applicator whereby solvents in the solution lift the iron oxide residue from the surface of the magnetic tape head and dissolve this residue in the solution. After a brief period of time e.g. a few seconds, the solvent system evaporates leaving a semi-dry liquid containing micropulverized metal oxides. This liquid is then removed by means of the applicator and in the process, the surface of the magnetic head is both cleaned and polished by the micropulverized metal oxides. The oxides remove all surface irregularities from the head and leave a micro-polished surface. Silanes contained in the solution adhere to the head surface and as the excess residue is removed by the applicator, a small percentage remains coated on the surface of the magnetic head as a lubricant. After a few strokes of the applicator across the face of the magnetic head, a dry, polished coating is obtained. This dry, polished and lubricated coating prevents any further tape oxide buildup on the head.

SUMMARY OF THE INVENTION

The liquid of this invention comprises a solution of;
(a) a mixture of micropulverized inorganic oxides;
(b) a mixture of lower alkyl silanes;
(c) an alkaline earth metal carbonate;
(d) a long chain fatty acid; and
(e) a solvent mixture of lower alkyl alcohols A method for cleaning, polishing and lubricating magnetic record/playback heads is also provided which comprises:

(a) applying the liquid solution of this invention to the surface of the head;

(b) allowing the alcohol solvents to evaporate to a semi-dry solution on the head; and (c) rubbing the surface of the head until a dry, polished coating is obtained.

The function of the alcohol solvents is to evenly distribute the other dissolved compounds over the surface of the magnetic head to which it is applied. The alcohols also lift off the iron oxide residue deposited on the surface of the head and dissolve this residue in the solution. After the alcohols are allowed to evaporate, a semi-dry liquid containing the remaining components are deposited on the tape. By gently rubbing the semi-dry liquid, the micropulverized oxides in the liquid, being mildly abrasive, clean the surface of the magnetic head and remove all surface irregularities, while the silanes coat the head surface. As the excess residue is removed by the applicator, a percentage remains coated on the surface of the head as a lubricant to prevent surface humidity or oils from permeating the protective polished surface.

DETAILED DESCRIPTION OF THE PREFERRED EMBODIMENTS

The micropulverized metallic oxide components of this invention comprise a mixture of aluminum oxide, $Al_2O_3$, chromium oxide, $CrO$, tin oxide, $SnO$, and yellow lead oxide, $PbO$. The mixtures of oxides act as fine abrasives for polishing the surface of the magnetic head. The silanes of this invention include dimethyl silane $(CH_3)_2SiH_2$, methyltrichlorsilane $CH_3SiCl_3$, and ethyldisilane $C_2H_5SiH_2SiH_2$. The function of the mixture of silanes is to provide an impenetrable coating on the surface. The long chain fatty acid used in the solution can be any long chain fatty acid having from about 16–20 carbons, preferably 18 carbon atoms. Stearic acid is particularly preferred. The long chain fatty acid component also acts as a cleaning agent. The alkaline earth carbonates can be such compounds as calcium, magnesium, or strontium carbonate and is preferably calcium carbonate. The metal carbonate maintains a slight basicity of the solution, thereby preventing any acids from accumulating. The alcohols of this invention comprise alkyl alcohols having from 1–4 carbon atoms and preferably a mixture of methyl alcohol, isopropyl alcohol and ethyl alcohol. It is also preferred to use additional micropulverized oxides in the solution such as cuprous oxide $Cu_2O$, iron oxide, $Fe_3O_4$ and yellow iron oxide $Fe_2O_3$.

The compositions are prepared by dissolving all components viz., silanes, metal oxides, fatty acid, alkaline earth metal carbonate in the mixture of alcohols and stirring until a homogeneous liquid is obtained.

Generally, it is preferred that all components in the liquid solution be used in about equal parts by weight except for the alcohols which are used in greater amounts. Each component, other than the alcohols, should comprise from about 0.2% to about 33% by weight and preferably about 20% by weight of the total solution and the total alcohols should comprise from about 67% to 99.8% by weight, preferably about 80% by weight. The amount of each alcohol should be about equal.

A preferred formulation follows:

| Component | Ounces |
|---|---|
| Stearic acid | ½ |
| Iron oxide | ½ |
| Aluminum oxide | ½ |
| Cuprous oxide | ½ |
| Chromium oxide | ½ |
| Tin oxide | ½ |
| Yellow lead oxide | ½ |
| Yellow iron oxide | ½ |
| Calcium carbonate | ½ |
| Dimethylsilane | ½ |
| Methyltrichlorsilane | ½ |
| Ethyldisilane | ½ |
| Methyl alcohol | 8 |
| Isopropyl alcohol | 8 |
| Ethyl alcohol | 8 |
| Total | 30 |

In the process for cleaning, polishing and lubricating a magnetic record/playback head using the above solution, the solution is first applied to the surface of the magnetic head by means of a cotton swab of other soft non-abrasive material. The alcohol distributes the components evenly over the surface of the head and acts to lift the tape oxide residue off the head surface which becomes part of the solution itself. The alcohol is then allowed to dry for a few seconds to a semi-dry state. This remaining semi-dry solution is then removed by gently rubbing with a soft non-abrasive material. In rubbing, the oxides in the solution act to clean the surface of the head while the silanes, as a lubricant, form a dry, lubricated coating thereon which is impermeable to dust, water and oils.

I claim:
1. A liquid solution comprising:
   (a) a mixture of micropulverized inorganic oxides;
   (b) a mixture of lower alkyl silanes;
   (c) an alkaline earth metal carbonate;
   (d) a long chain fatty acid having from 16 to 20 carbons atoms; and
   (e) a solvent mixture of lower alkyl alcohols having from about 1 to 4 carbon atoms.
2. The solution of claim 1 wherein said mixture of micropulverized inorganic oxides comprises aluminum oxide, chromium oxide, tin oxide and yellow lead oxide.
3. The solution of claim 1 wherein said mixture of lower alkyl silanes comprises dimethylsilane, methyltrichlorsilane and ethyl disilane.
4. The solution of claim 1 wherein said alkaline earth metal carbonate is calcium carbonate.
5. The solution of claim 1 wherein said fatty acid is stearic acid.
6. The solution of claim 1 wherein said mixture of alcohols comprises methyl alcohol, ethyl alcohol and isopropyl alcohol.
7. The solution of claim 1 wherein each of said oxides, silanes, carbonate, and fatty acid are present in equal parts by weight in said solution and totally comprise from about 0.2% to about 33% by weight of said solution.
8. The solution of claim 1 wherein each of said alcohols in said mixture is present in equal parts by weight and said alcohol mixture totally comprises from about 67% to about 99.8% by weight of said solution.
9. The solution of claim 1 which further comprises cuprous oxide, iron oxide and yellow iron oxide.
10. A solution for cleaning, polishing and lubricating the magnetic record/playback head of a tape recorder comprising:
    (a) a mixture of micropulverized inorganic oxides comprising aluminum oxide, chromium oxide, tin oxide, yellow lead oxide, cuprous oxide, iron oxide, and yellow iron oxide;
    (b) a mixture of lower alkyl silanes comprising dimethylsilane, methyltrichlorsilane, and ethyldisilane;
    (c) stearic acid;
    (d) calcium carbonate; and
    (e) a solvent mixture of alcohols comprising methyl alcohol, ethyl alcohol and isopropyl alcohol.
11. The solution of claim 10 wherein each of said oxides, silanes, stearic acid and calcium carbonate are present in equal amounts and totally comprise from about 0.2% to about 33% by weight of said solution.
12. The solution of claim 10 wherein each of said alcohols is present in equal amounts by weight in said solution and totally comprise from about 67% to 99.8% by weight of said solution.
13. A liquid solution comprising:
    (a) a mixture of micropulverized inorganic oxides;
    (b) a mixture of lower alkyl silanes;
    (c) an alkaline earth metal carbonate;
    (d) a long chain fatty acid having from 16 to 20 carbon atoms: wherein each of said oxides, silanes, carbonate, and fatty acid are present in equal parts by weight in said solution and totally comprise from about 0.2% to about 33% by weight of said solution; and
    (e) a solvent mixture of lower alkyl alcohols having from about 1 to about 4 carbon atoms, wherein each of said alcohols in said mixture is present in equal parts by weight and said alcohol mixture totally comprises from about 67% to about 99.8% by weight of said solution.

14. A solution for cleaning, polishing and lubricating the magnetic record/playback head of a tape recorder comprising:
 (a) a mixture of micropulverized inorganic oxides comprising aluminum oxide, chromium oxide, tin oxide, yellow lead oxide, cuprous oxide, iron oxide, and yellow iron oxide;
 (b) a mixture of lower alkyl silanes comprising dimethyl silane, methyltrichlorsilane, and ethyldisilane;
 (c) stearic acid;
 (d) calcium carbonate; wherein each of said oxides, silanes, stearic acid and calcium carbonate are present in equal amounts and totally comprise from about 0.2% to about 33% by weight of said solution; and
 (e) a solvent mixture of alcohols comprising methyl alcohol, ethyl alcohol and isopropyl alcohol; wherein each of said alcohols is present in equal amounts by weight in said solution and totally comprise from about 67% to 99.8% by weight of said solution.

* * * * *